W. H. SAWYER.

SALES SLIP HOLDER.

APPLICATION FILED FEB. 17, 1919.

Reissued Oct. 21, 1919.

14,739.

Inventor:
Walter H. Sawyer
William B. Hale
Atty.

UNITED STATES PATENT OFFICE.

WALTER H. SAWYER, OF PHILADELPHIA, PENNSYLVANIA, ASSIGNOR TO THE ARCUS TICKET CO., OF CHICAGO, ILLINOIS, A CORPORATION OF ILLINOIS.

SALES-SLIP HOLDER.

14,739. Specification of Reissued Letters Patent. Reissued Oct. 21, 1919.

Original No. 1,264,980, dated May 7, 1918, Serial No. 34,324, filed June 15, 1915. Renewed September 20, 1917, Serial No. 192,415. Application for reissue filed February 17, 1919. Serial No. 277,686.

*To all whom it may concern:*

Be it known that I, WALTER H. SAWYER, a citizen of the United States, and a resident of Philadelphia, in the county of Philadelphia and State of Pennsylvania, have invented certain new and useful Improvements in Sales-Slip Holders; and I do hereby declare that the following is a full, clear, and exact description thereof, reference being had to the accompanying drawings, and to the characters of reference marked thereon, which form a part of this specification.

My invention relates to a supporting device for sales slips or checks, and has for its principal object to provide a device of this character wherein the stub portions of sales slips or checks may be retained after severance of the latter and also to provide means whereby a sales amount may be indicated on a slip for delivery to a purchaser.

In accomplishing this object I have provided the details of structure hereinafter described and illustrated in the accompanying drawings, wherein:—

Figure 1:
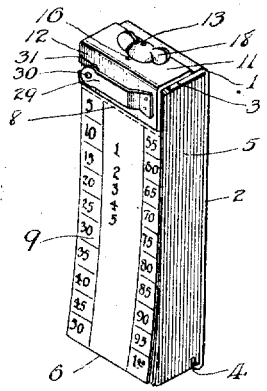
Figure 1 is a perspective view of a sales slip holder constructed according to my invention.
Figure 2:
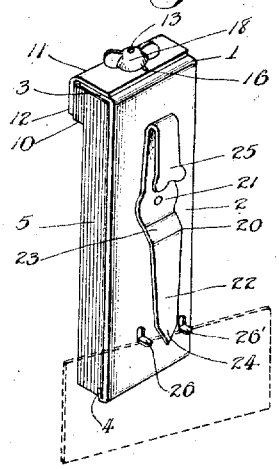
Fig. 2 is a back view of the same, particularly illustrating the means for indicating a sales amount.
Figure 3:
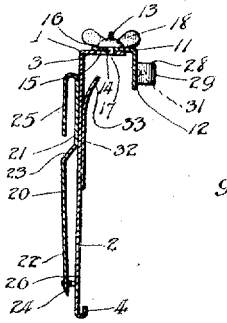
Fig. 3 is a longitudinal section of the holder.
Figure 4:
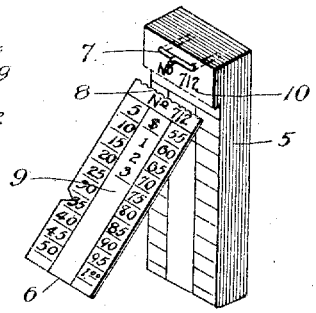
Fig. 4 is a perspective view of a check pack which may be used in the holder, showing a check removed from its stub and a sales amount indicated thereon.

Referring more in detail to the drawings:—

1 designates a sales slip or check holder embodying my invention, comprising a back or supporting plate 2 provided at its upper edge with an outturned flange 3 and at the lower end with an upturned lip 4; the said back plate and flanges being adapted for receiving a check pack 5, of any suitable character wherein the sales amounts are placed adjacent the edges of the slip.

The preferred form of pack comprises a plurality of separate slips 6, which are bound together at their upper ends by wire stitching 7, and are provided with a transverse row of perforations 8 to facilitate the removal of the lower check portion 9 from the upper stub portion 10.

Seated on the outturned flange 3 of the back plate 2 is an adjustable plate 11, having a downturned flange 12 at its front edge which is adapted for seating over the stub end of the pack 5, and may be tightened and held thereagainst by means of a set screw 13, having a shank portion 14 which extends through a slot 15 in the flange 3, and an aperture 16 in the plate 11, and is provided at its inner end with a head 17 and at the outer end with a thumb nut 18, whereby the plate 11 may be clamped to the flange 2 to hold the check pack securely within the holder. This construction may be employed when it is desired to provide adjustment for packs of different thicknesses.

Supported on the plate 2 is a marker 20, comprising a body portion 21 which has a downwardly extending arm 22 that is offset from the plate 2 by an outstanding portion 23, and the end of the arm has a cutting point 24, which is yieldable toward the plate 2. The upper end of the body portion 21 is shown as extended upwardly and bent downwardly to form a hook 25, whereby the holder may be suspended from the belt or pocket of the user.

Stamped from the body plate 2 near the point 24 of the marker are outstanding ears 26—26′ which provide stops for a check or slip 6, which may be seated thereagainst when a sales amount is to be indicated thereon. The said ears may be slightly offset from each other to provide for an easy placement of the ticket and to facilitate the tearing of the notch therefrom.

In order that amounts other than those printed at the edges may be indicated on the check, I provide a punch 28 comprising a spring arm 29, which is secured in spaced relation to the clamp plate flange 12 and has an end aperture 30, which registers with a stud 31 projecting from the plate, thus forming a die whereby the ticket may be punched at an interior point.

As a means of more securely fastening the tickets within the clamp parts I may provide a spring plate 32, which is secured or fixed to the plate in any suitable manner and has a free end 33, adapted for seating against the back of a ticket pack 5 to engage the loop of the wire stitching, so that the pack may not slip downward from the clamp parts. The spring plate 33 also coacts with the flange 11 to clamp the pack in place, and may be used with or without the adjustable flange.

Assuming that the holder is so constructed a ticket pack may be placed within the flange of the back plate 2, and secured therein by clamping the plate 11 thereagainst when an adjustable holder is provided. When a sale is made to a purchaser the one making the same tears a slip from the pack, places it beneath the marker point 24 against the ears 26—26′, so that the amount of the sale to be marked on the ticket will be directly beneath the point of the marker. The arm 22 is then pressed downwardly against the ticket, and by pulling the ticket thereagainst a V shaped notch is torn in the edge of the ticket adjacent the amount of the sale. If it is then desired to punch a numeral other than those adjacent the edge of the ticket, the ticket is placed in the punch 28 with the amount to be punched beneath the aperture of the arm, and by pressure of the arm thereagainst, the stub will be projected into the arm aperture, and a hole punched in the ticket at that point to indicate the desired amount.

It is apparent that by so constructing the holder, a simple and convenient means is provided for carrying and marking the checks, and that the holder may be adjusted to accommodate packs containing various numbers of checks. It is furthermore understood that the invention is capable of embodiments differing specifically from the illustrated structure, within the spirit of the claims hereto appended.

I claim as my invention:

1. A check holding and notching device comprising an elongated support provided at one end with holding means for a book of checks and provided at its other end with an integral check limiting member, and a marker spaced from said support and having a tearing projection at and coöperating with said limiting member to mark a check at its edge which engages said limiting member.

2. A combined check holder and marker comprising a supporting member having means to clamp a pack of checks thereon, a pair of check limiting stops integral with said member, and a marker having a tearing end normally spaced from said member and projecting between said stops, said marker being yieldably supported on said member whereby its tearing end is movable toward and from said member.

3. In a check notching device, a support having a sharp edged resilient tongue disposed out of the plane of the support to permit the insertion of a check or the like therebetween, and a pair of stops formed upon the support at opposite sides of said tongue for limiting the said insertion of the check or the like, the said stops comprising lugs formed from the support and bent away from the end from which the check is inserted.

4. A combined check holder and punch comprising a supporting plate, having rearwardly projecting stop members thereon, and a marker secured to the back of said supporting plate, having an end projecting between said stop members and yieldable toward the said plate.

5. A combined check holder and punch comprising a supporting plate having rearwardly projecting stop members thereon, and having forwardly turned end portions or flanges adapted for receiving a check pack therebetween, a clamp plate adjustably secured to the upper end flange, having a down turned portion adapted for seating over the end of the check pack, a marker secured to said supporting plate comprising an arm offset from said plate and having a pointed end portion projecting between said stop members and yieldable toward said plate, and a hook integrally formed with said arm portion for supporting the said holder.

6. A check holder and punch comprising a supporting plate having spaced stop ears projecting outwardly therefrom, a marker comprising a body portion secured to the supporting plate having an integrally formed arm extending therefrom, said arm being spaced from the supporting plate and having a pointed end portion projecting between said spaced ears and yieldable toward said supporting plate.

7. A check holder and punch comprising a plate for supporting a check pack having stop ears stamped outwardly therefrom; said ears being spaced and in offset relation to each other, a check marker comprising a central body portion secured to the supporting plate, an upper hook member integrally formed with said body portion for supporting said holder, and a marking arm integral with said body portion and offset from the pack supporting plate, said marking arm projecting between said stop ears and having a V-shaped point yieldable toward the supporting plate.

8. A check holder and punch comprising a plate formed at one end to provide a front flange and a rear yieldable clamp member between which a stub of a pack of checks is clamped, said plate being formed at its other end to provide a stop member, and a marker fixed relatively to the plate and having a pointed end at said stop member yieldable toward and from the plate.

9. A holder for a pad of checks equipped on one face with a formation interrupting the plane surface of the said face, comprising a socket adapted to receive the portion of the pad having the said formation, and resilient means engaging the said formation to lock the pad in the holder.

10. A holder for a pad of sales checks comprising a body portion adapted at one end with a flange between which and said body portion the stub of a check book is adapted to be received, and a resilient member directed toward the latter end of the body and oblique both to said end and to said flange, thereby preventing the withdrawal of the clampingly held check stub by movement away from said end.

11. A holder for a staple joined tab of sales checks, comprising a body formed to provide a substantially U-shaped socket for receiving the stub end of the tab, and resilient means carried by the plate for engaging the staple on the tab and to normally prevent the withdrawal of the tab.

12. A holder for a tab of checks united near one end by a staple presenting an exposed portion on one face of the tab, comprising a substantially U-shaped socket adapted to receive the said end of the tab, and yielding means mounted in the socket and disposed for interlocking with the exposed portion of the staple to prevent a withdrawal of the tab by a subsequent movement substantially parallel to the axis of the said socket.

13. A check holder and punch comprising a back plate provided at one end with a flange between which and said plate the stub of a check book is adapted to be received, and a rear yieldable clamp member on the back plate adapted to engage at its free end the loop of the wire stitching of a check pack.

In testimony whereof I claim the foregoing as my invention, I hereunto append my signature at New Orleans, Louisiana, this February 3d, 1918.

WALTER H. SAWYER.